United States Patent [19]

Ragan et al.

[11] Patent Number: 4,551,485
[45] Date of Patent: Nov. 5, 1985

[54] POLY(ETHYLENE TEREPHTHALATE) BLENDS

[75] Inventors: Gary S. Ragan; Jesse D. Jones, both of Baton Rouge, La.

[73] Assignee: Ethyl Corporation, Richmond, Va.

[21] Appl. No.: 647,059

[22] Filed: Sep. 4, 1984

[51] Int. Cl.$^4$ ............................................. C08K 3/40
[52] U.S. Cl. ................................. 523/212; 523/213; 523/214; 524/261; 524/262; 524/263; 524/264; 524/265; 524/449; 524/605; 524/109; 524/114
[58] Field of Search ...................... 523/214, 213, 212; 524/605, 449, 261, 262, 263, 264, 265

[56] References Cited

U.S. PATENT DOCUMENTS

| | | | |
|---|---|---|---|
| 3,368,995 | 2/1968 | Furukawa et al. | 524/605 |
| 3,619,266 | 11/1971 | Weissermel et al. | 524/114 |
| 3,652,484 | 3/1972 | Weissermel | 524/265 |
| 3,769,260 | 10/1973 | Segal | 524/605 |
| 3,855,175 | 12/1974 | Kakizaki | 523/214 |
| 4,276,208 | 6/1981 | Ogawa et al. | 524/605 |
| 4,386,027 | 5/1983 | Cohen | 523/212 |
| 4,455,343 | 6/1984 | Temple | 524/265 |
| 4,486,561 | 12/1984 | Chung et al. | 524/107 |

*Primary Examiner*—Lewis T. Jacobs
*Attorney, Agent, or Firm*—Donald L. Johnson; John F. Sieberth; E. Donald Mays

[57] ABSTRACT

The impact strength of thermoplastic poly(ethylene terephthalate) molding compositions containing a reinforcing filler (preferably glass fiber), an epoxidized crystallization promoter (e.g., an epoxidized vegetable oil) and a nucleating agent (e.g., sodium stearate) is markedly improved by including in the composition a small amount of an organofunctional silane, i.e., a compound characterized by having a functional substituent at the end of a methylene chain bound to a silicon atom to which are also bonded a plurality of readily hydrolyzable groups. A few such compounds are gamma-aminopropyltriethoxysilane, gamma-glycidoxypropyltrimethoxysilane, gamma-aminopropyltriethoxysilane and gamma-glycidoxypropyltrimethoxysilane. The formulations may also contain a warp-reducing filler such as mica. Organofunctional silanes typically have application in thermoplastic polymers only as coupling agents, i.e., agents that act to bind the resin to a reinforcing filler so that improved tensile strength and tensile modulus are obtained. However, in the present compositions the organofunctional silanes appear to function in a new and different way—they serve as effective impact modifiers for the PET blends and in so doing, provide significantly improved Izod Impact results. Normally the tensile strength and tensile modulus are not materially changed by the addition of the organofunctional silanes.

19 Claims, No Drawings

POLY(ETHYLENE TEREPHTHALATE) BLENDS

FIELD OF THE INVENTION

The present invention relates to impact modified poly(ethylene terephthalate) blends having superior physical properties. More particularly, the invention relates to impact modified poly(ethylene terephthalate) (PET) blends which are injection moldable at a relatively low mold temperature.

BACKGROUND OF THE INVENTION

Poly(ethylene terephthalate) (PET) has become an important raw material for production of moldings, film and fibers. Preparation of PET is described inter alia in Whinfield et al., U.S. Pat. No. 2,465,319 and in Pengilly, U.S. Pat. No. 3,047,539, and in Kirk-Othmer, *Encyclopedia of Chemical Technology*, Second Edition, Vol. 16, pp. 159 et seq. (1968), all disclosures being incorporated herein by reference.

Many applications for injection and extrusion molded parts require heat resistance, and it is in such applications that PET manifests certain undesirable properties. Unreinforced PET has been of limited interest for making such parts due to its low HDT (Heat Deflection Temperature)—about 75° C. at 264 psi. HDT is a measure of an important thermal property of a thermoplastic material wherein a bar of the material, held in flexure under constant load (usually at 264 or 66 psi), deforms a specified amount and the temperature at which this specified deformation occurs is the HDT—see Billmeyer, *Textbook of Polymer Science*, p. 112, John Wiley and Sons, Inc. (1962).

It is desirable to have PET compositions which have improved Izod Impact strengths. In compositions such as these, it is oftentimes difficult to find an impact modifier which not only provides the sought after increase in Izod Impact strength but also does so without negating other desirable physical properties such as HDT. Thus a welcome contribution to the art would be an impact modifier that provides improved Izod Impact strength without negating other improved properties in the PET, such as HDT.

SUMMARY OF THE INVENTION

The present invention provides novel poly(ethylene terephthalate) (PET) compositions having substantially higher impact resistance than general purpose grades of PET. The impact strength improvement is achieved by the use of a small amount of an organofunctional silane and can thus be implemented at low cost.

Obtaining increased impact strength of PET resins in this manner is believed unprecedented since organofunctional silanes are typically believed to have application in thermoplastic polymers only as coupling agents, i.e., agents that act to bind the resin to a reinforcing filler so that improved tensile strength and tensile modulus are obtained. However, in the practice of this invention the organofunctional silanes in themselves appear to function in a new and different way—they serve as effective impact modifiers for the PET blends and in so doing, provide significantly improved Izod Impact results. Sometimes an improvement is also observed in heat deflection temperature.

That the simple addition of an organofunctional silane to reinforced PET blends produces significant improvements in impact strength is deemed surprising and inexplicable because these improvements are obtained even when using commercially available reinforcing materials (glass fiber, mineral fillers, etc.) which have already been treated with a coupling agent. Moreover, the use of an organofunctional silane in the PET blends of this invention normally does not result in any significant change in tensile strength or tensile modulus, thus indicating that the organofunctional silane is not functioning to any appreciable extent as a coupling agent in these blends.

In one of its preferred embodiments this invention provides an impact modified thermoplastic composition which is injection moldable at a relatively low mold temperatures (i.e., about 100° C. and below), which composition comprises an intimate admixture of:

(a) a poly(ethylene terephthalate);
(b) an epoxidized crystallization promoter;
(c) a nucleating agent cooperative with the epoxidized crystallization promoter of (b) to improve the releasability from the injection mold of articles injection molded from said composition at mold temperatures at least as low as 93° C.;
(d) a reinforcing amount of a reinforcing filler; and
(e) an organofunctional silane.

In another embodiment of this invention the above composition additionally contains a warp-reducing filler such as mica. Other embodiments will become apparent from the ensuing description and appended claims.

The organofunctional silane (e) utilized in the compositions provided by this invention yields blends with improved Izod Impact strength without detracting from other desirable physical properties, such as heat deflection temperature.

DETAILED DESCRIPTION OF THE INVENTION

(a) Poly(ethylene terephthalates)

The poly(ethylene terephthalate) used herein is crystallizable and is preferably homopolymeric PET. Halogenated crystallizable PET can also be used and is normally formed by condensation of a mixture of a halogenated, preferably brominated, terephthalate acid (e.g., 2,5-dibromoterephthalic acid and 2,3,5,6-tetrabromoterephthalic acid) and terephthalic acid with ethylene glycol. Additionally, providing the resulting copolymer is crystallizable, the poly(ethylene terephthalate) used herein can also contain radicals of other aromatic dicarboxylic acids such as, for example, phthalic acid, isophthalic acid, naphthalene-2,6-dicarboxylic acid, diphenyl-4,4'-dicarboxylic acid and the like as well as their halogenated counterparts. The copolymers, provided the copolymer remains crystalline, can also contain radicals of other glycols such as, for example, propylene glycol, butylene glycol, dibromoneopentyl glycol, bis(2-hydroxyethyl)ether of tetrabromobisphenol A and tetrabromo-p-xylylene glycol. See for example Kirk-Othmer, *Encyclopedia of Chemical Technology*, Second Edition, Vol. 16, pp. 161–172 (1968).

The poly(ethylene terephthalates) used herein may be virgin or recycled PET's and should be moldable (i.e., injection moldable or moldable by extrusion), and thus generally will have an intrinsic viscosity (I.V.) falling between about 0.25 and 1.5, and more usually between about 0.5 and 1.2, as measured at 25° C. using a solvent consisting of 60 percent by weight phenol and 40 percent by weight of tetrachloroethane. For best results the poly(ethylene terephthalate) should have an I.V. (measured in the foregoing manner) in the range of 0.4 to 1.2, more preferably between 0.5 and 1.1, and for most injection molding applications poly(ethylene terephthalates) in which the I.V. is in the range of 0.5 to 0.9 are deemed most desirable.

(b) Epoxidized Crystallization Promoter

A wide variety epoxidized crystallization promoters may be used in the practice of this invention. One general type which has been found particularly efficacious is the class of materials known in the trade as epoxidized plasticizers for polyvinyl chloride and other similar plastic materials. In the compositions of this invention such epoxy materials take on a new function, viz., they cooperate with a nucleating agent to improve the releasability from the injection mold of articles injection molded from the composition at mold temperatures at least as low as 93° C. and undoubtedly even lower. For further details concerning this co-action between "epoxidized plasticizer"-type crystallization promoter and nucleating agent as well as an extensive description of materials that are suitable for this purpose, reference should be had to U.S. Pat. No. 4,486,561 to Chung, Jones and Li (copending application Serial No. 513,677, filed July 14, 1983) assigned to the same assignee as the present application, all disclosure of which is incorporated herein by reference. While any type of "epoxidized plasticizer"-type of crystallization promoter may be employed in the practice of the invention preferred types include the following:

(1) a hydrocarbyl ester of a mono epoxidized alkenoic acid, said ester being characterized by containing from about 12 to about 50 carbon atoms (preferably from about 16 to about 36 carbon atoms) in the molecule;

(2) an epoxidized unsaturated triglyceride containing at least one epoxide group; and (3) an epoxy ester mixture comprising at least one monoepoxy aliphatic monocarboxylic acid ester and at least one diepoxy aliphatic monocarboxylic acid ester in which each of the epoxy esters contains from about 7 to about 50 carbon atoms in the molecule. A few illustrative examples of the "epoxidized plasticizer"-type of crystallization promoter that are available as articles of commerce and are preferred for use in the blends of this invention include:

Epoxidized octyl oleate (which is also referred to as octyl epoxy stearate) having a 3.6% by weight minimum oxirane oxygen content, epoxidized soybean oil having a 7.0% by weight minimum oxirane oxygen content and epoxidized linseed oil having a 9.3% by weight minimum oxirane oxygen content which can be purchased under the respective designations DRAPEX 3.2, DRAPEX 6.8, and DRAPEX 10.4 from Argus Chemical Corporation, Brooklyn, N.Y., 11231.

Epoxidized esters of soybean oil acids and linseed oil acids such as are available from Viking Chemical Company, 838 Baker Building, Minneapolis, Minn., 55402, under the product designation VIKOFLEX. Among such epoxidized esters are: methyl epoxy soyate (VIKOFLEX 7010), ethyl epoxy soyate (VIKOFLEX 7020), propyl epoxy soyate (VIKOFLEX 7030), butyl epoxy soyate (VIKOFLEX 7040), hexyl epoxy soyate (VIKOFLEX 7060), octyl epoxy soyate (VIKOFLEX 7080), methyl epoxy linseedate (VIKOFLEX 9010), ethyl epoxy linseedate (VIKOFLEX 9020), propyl epoxy linseedate (VIKOFLEX 9030), butyl epoxy linseedate (VIKOFLEX 9040), hexyl epoxy linseedate (VIKOFLEX 9060) and octyl epoxy linseedate (VIKOFLEX 9080).

An epoxy ester mixture of the fatty acid fraction of tall oil having a 5.0% by weight minimum oxirane oxygen content commercially available from Argus Chemical Corporation, 633 Court Street, Brooklyn, N.Y., 11231 under the product designation DRAPEX 4.4, which is octyl epoxy tallate.

Monoepoxyalkanes are another class of epoxidized crystallization promoters which are particularly efficacious in the blends of this invention. As disclosed in U.S. Pat. No. 4,385,144 of Jones, Whitehead and Hornbaker and assigned to the same assignee as the present application, monoepoxyalkanes have the ability of co-operating with nucleating agents or adjuvants to confer markedly improved mold release properties to PET compositions injection molded at low mold temperatures of 93° C. and below. Thus for further details as to the nature and use of such monoepoxyalkanes reference should be had to U.S. Pat. No. 4,385,144, all disclosure of which is incorporated herein by reference. Generally speaking the monoepoxyalkane should have from about 10 to about 50 and preferably from about 10 to about 30 carbon atoms in the molecule. Use of 1,2-epoxyalkanes is particularly preferred.

A few illustrative examples of the monoepoxyalkane-type of crystallization promoter that are available as articles of commerce and are preferred for use in the blends of this invention include:

VIKOLOX 10 (1,2-epoxydecane);
VIKOLOX 12 (1,2-epoxydodecane);
VIKOLOX 14 (1,2-epoxytetradecane);
VIKOLOX 16 (1,2-epoxyhexadecane);
VIKOLOX 18 (1,2-epoxyoctadecane);
VIKOLOX 20 (1,2-epoxyeicosane);
VIKOLOX 11-14 (blend of $C_{11}$ to $C_{14}$ 1,2-epoxyalkanes);
VIKOLOX 15-18 (blend of $C_{15}$ to $C_{18}$ 1,2-epoxyalkanes);
VIKOLOX 20-24 (blend of $C_{20}$ to $C_{24}$ 1,2-epoxyalkanes);
VIKOLOX 24-28 (blend of $C_{24}$ to $C_{28}$ 1,2-epoxyalkanes).

These VIKOLOX brand of products are available from Viking Chemical Company, 838 Baker Building, Minneapolis, Minn., 55402.

Still other types of epoxidized crystallization promoters should prove useful in the blends of this invention. And if desired, combinations of different crystallization promoters may be employed.

While variations in proportions are feasible and permissible, it is generally preferable to employ the epoxidized crystallization promoter in amounts in the range of from about 0.5 to about 12 parts per hundred parts of PET (i.e., from about 0.5 to about 12 phr). Most preferably, the amounts used will fall within the range of from about 2 to about 8 parts of epoxidized crystallization promoter per hundred parts of PET.

(c) Nucleating Agents

The number and types of materials that may be used as nucleating agents in the compositions of this invention are virtually limitless. For example use may be made of the nucleating agents/adjuvants referred to in the foregoing patents to Chung, Jones and Li and to Jones, Whitehead and Hornbaker.

Among the preferred nucleating agents are the alkali metal salts of carboxylic acids, such as alkali metal salts of aliphatic monocarboxylic acids and alkali metal salts of aromatic carboxylic acids. Examples include but are not limited to: sodium acetate, sodium propionate, sodium n-butyrate, sodium caprylate, sodium myristate, potassium stearate, sodium stearate, sodium montanate, sodium benzoate and the like. Additional useful alkali metal salts of carboxylic acids may include, for example, the potassium salts of such aliphatic monocarboxylic acids as, for example, acetic acid, montanic acid, benzoic acid and the like; the sodium or potassium salts of such aliphatic monocarboxylic acids as, for example, formic acid, valeric acid, caproic acid, enanthic acid, pelargonic acid, capric acid, undecanoic acid, lauric acid, tridecanoic acid, pentadecanoic acid, palmitic acid, margaric acid, nonadecanoic acid, arachidic acid, heneicosanoic acid, behenic acid, triconanic acid, tetracosanic acid, pentacosanoic acid, cerotic acid and the like; the sodium or potassium salts of unsaturated aliphatic monocarboxylic acids, such as, for example, methacrylic acid, acrylic acid, butenoic acid and the like; the sodium or potassium salts or aromatic carboxylic acids, such as, for example, toluic and, p-tert-butylbenzoic acid, veratric acid, gallic acid, phthalic acid, isophthalic acid, terephthalic acid, homophthalic acid, and the like, the sodium or potassium salts of mildly unsaturated aliphatic monocarboxylic acids, such as, for example, the fatty acids oleic acid, ricinoleic acid, linoleic acid, palmitoleic acid, vaccenic acid, erucic acid and the like; the sodium or potassium salts of aliphatic dicarboxylic acids, such as, for example, oxalic acid, malonic acid, succinic acid, glutaric acid, adipic acid, pimelic acid, suberic acid, azelaic acid, sebacic acid, brassylic acid and the like; the sodium or potassium salts of unsaturated aliphatic dicarboxylic acids, such as, for example, maleic acid, fumaric acid, glutanconic acid and the like; the sodium or potassium salts of aliphatic tricarboxylic acids, such as, for example, tricarballyic acid, citric acid and the like; and the sodium or potassium salts of dimers or trimers of saturated or unsaturated carboxylic acids, such as, for example, dimers and trimers of $C_{18}$ fatty acids, such as, for example, oleic and linoleic acids.

Alkali metal salts of aromatic carboxylic acids substituted with halogen and/or nitro groups are also useful as nucleating agents, such as, for example sodium 2-chloro-4-nitrobenzoate. Other substituted aromatic monocarboxylic acids may also be effective. Examples include, but are not limited to, the sodium and potassium salts of 2-, 3-, or 4-chlorobenzoic acid, 2- or 4-chloro-3,5-dinitrobenzoic acid, 2-chloro-6-fluorobenzoic acid, 2-chloro-3-nitrobenzoic acid, 2-chloro-5-nitrobenzoic acid, 2-chloro-5-nitrobenzoic acid, 3-chloro-2-nitrobenzoic acid, 4-chloro-2-nitrobenzoic acid, 4-chloro-3-nitrobenzoic acid, 5-chloro-2-nitrobenzoic acid, and the like.

Still other useful nucleating agents include but are not limited to: inorganic compounds, such as, for example, boron nitride and the like; the alkali metal salts of carbonic acid, such as, for example, sodium carbonate, and the like; minerals, such as, for example, talc (available as MICROTALC CP-10-40 from Pfizer Inc.), mica and the like; commercially available soaps, such as, for example, IVORY SNOW (manufactured by The Procter and Gamble Company of Cincinnati, Ohio and believed to comprise the sodium salts of tallow fatty acids and the sodium salts of coconut fatty acids) and the like; ionomer resins (sodium salt), preferably those having a melt flow index of from about 1.0 to about 2.8 g/10 min. as measured by ASTM procedure D1236, such as, for example, SURLYN 8940 having a melt flow index of 1.0 g/10 min., SURLYN 8528 having a melt flow index of 1.0 g/10 min. and SURLYN 1605 having a melt flow index of 2.8 g/10 min. (manufactured by E. I. du Pont de Nemours and Company) and the like.

Other substances which are known as nucleating agents for PET or the like and which may be used in the blends of this invention include metal salts of carboxylic acids such as zinc, lead, calcium, barium and cupric laurates and stearates, and potassium benzoate; metal salts of inorganic acids such as silver nitrate and stannous chloride; highly polar organic compounds such as m-hydroxybenzoic acid, tetrachlorophthalic anhydride, inositol and phthalimide; sodium and potassium salts of organic polymers containing pendant carboxyl groups such as copolymers of olefins and acrylic or methacrylic acids and copolymers of aromatic olefins and maleic anhydride; and the like. Note in this connection French Pat. No. 2,129,162; British Pat. No. 2,015,013; and *The British Polymer Journal,* Volume 11, pages 146–150 (September, 1979) and other literature on the subject.

If desired, combinations of different nucleating agents may be employed in the practice of this invention.

Sodium stearate is a particularly preferred nucleating agent because of its outstanding performance characteristics when combined with epoxidized crystallization promoters of the type discussed above. Standard commercial grades or heat stable grades of sodium stearate are utilizable in the compositions of this invention. For example, suitable sodium stearate can be purchased as "Sodium Stearate T-1" or "Sodium Stearate, Heat Stable" from Witco Chemical Corporation, Organic Division, New York, N.Y., 10017.

The amount of nucleating agent is preferably within the range of from about 0.1 to about 5 parts per 100 parts of PET, with about 0.5 to about 3 parts being more preferred and with about 0.5 to about 2 parts being even more preferred and with about 1 part being most preferred. However departures from these proportions made be made to suit the needs of the occasion.

To insure even dispersion of the nucleating agent and the epoxidized crystallization promoter in the PET, it is preferred that the nucleating agent and the epoxidized crystallization promoter, when either or both exist as a solid, be of a particle size so that at least 30% will pass through a 100 mesh U.S. Standard Sieve.

(d) Reinforcing Fillers

The filler, depending on its nature, can increase the strength and impact qualities of the PET composition. In fact, the use of a reinforcing filler is often required by most present day commercial usage of injection molded PET. In general, any reinforcement can be used, e.g., fibers, whiskers, or platelets of metals, e.g., aluminum, iron or nickel, and the like, and non-metals, e.g., ceramics, carbon filaments, silicates, asbestos, titanate whiskers, quartz, glass flakes and fibers, and the like. Although it is only necessary to have at least a reinforcing amount of the reinforcing filler present, in general, the filler will comprise from about 10 to about 160 parts per hundred of the unreinforced poly(ethylene terephthalate) resin. Amounts of filler, especially glass fibers, in the range of from about 30 to about 140 parts per hundred of the unreinforced PET are preferred as such compositions have particularly desirable properties. From the standpoint of ease of injection molding usage, reinforced compositions of this invention, especially those using glass fibers, preferably contain a filler constituent in an amount within the range of from about 30 to about 90 parts per hundred parts by weight of the unreinforced poly(ethylene terephthalate) resin.

Of the various fillers that may be used in the compositions of this invention, the preferred reinforcing fillers are glass. It is most preferred to use fibrous glass filaments of lime-aluminum borosilicate glass that are relatively soda free. This is known as "E" glass. The length of the glass filaments and whether they are bundled into fibers and the fibers bundled in turn to roving, etc., is not critical to this invention. However, it has been found convenient to use glass strands of at least about ⅛ inch in length. It is to be understood that during compounding considerable fragmentation of the strands will occur and that even further reduction of length occurs in the final injection molded article.

In the low-warp formulations of this invention it is desirable to to employ the combination of a reinforcing fiber, most preferably glass fiber, and one or more finely-divided warp-reducing fillers, preferably a finely-divided mineral filler and most preferably finely-divided mica. A wide variety of such materials are available on the open market. While the proportions are susceptible to variation in accordance with given circumstances, the low-warp compositions of this invention will usually contain from about 5 to about 60 phr of the fibrous reinforcing filler (e.g., glass fibers) and from about 3 to about 50 phr (preferably about 5 to 25 phr) of the finely-divided warp-reducing filler (e.g., powdered mica).

(e) Organofunctional Silanes

Generally, organofunctional silanes are simple organomonosilanes that have the ability to react both as silanes and as organic molecules. These compounds are characterized by having a functional substituent at the end of a methylene chain bound to a silicon atom to which are also bonded a plurality of readily hydrolyzable groups. A preferred class of such compounds may be represented by the structural formula

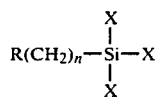

where R represents a reactive organic function attached to the terminal carbon of the methylene chain bound to silicon, and X represents a readily hydrolyzable group such as halogen (e.g., Cl, Br, I), alkoxy (e.g., $OCH_3$, $OC_2H_5$, etc.), polyalkoxy (e.g., $OC_2H_4OCH_3$, $OC_2H_4OC_2H_5$, etc.), and the like.

When used in their normal role as coupling agents, this dual organic-inorganic functionality permits the improvement in bonding between inorganic substrates and organic resins. As noted above, when used in the practice of this invention these compounds take on a new character and perform a new and different function, viz., they improve the impact strength of the blends apparently without exerting any appreciable improvement in bonding between the PET and the inorganic substrate (filler or reinforcing agent). As a consequence, their presence in the compositions of this invention normally results in a significant increase in Izod impact strength without any appreciable change in tensile strength or tensile modulus.

Many and various types of organofunctional silanes may be used in the practice of this invention, and a substantial number of such materials are commercially available from various suppliers. For example, use may be made of alkenylsilanes (e.g., vinylsilanes), aminoalkylsilanes, ureidoalkylsilanes, epoxyalkylsilanes, methacryloxyalkylsilanes, mercaptoalkylsilanes, and the like, all of which contain a plurality of readily hydrolyzable groups, such as halogen atoms or ester groups.

Typical organofunctional silanes of these types are available from Union Carbide Corporation under various trade designations. The organic functions available include amino in several forms (A-1100, A-1101, A-1102, A-1106, A-1108, A-1110, A-1120, A-1126, A-1130); vinyl (A-150, A-151, A-171, A-172, A-188); cycloaliphatic epoxy (A-186); aliphatic epoxy (A-187); methacryloxy (A-174, A-175); mercapto (A-189, A-1891); and ureido (A-1160).

A few exemplary materials are as follows:

Alkenylsilanes

Vinyltrichlorosilane, $CH_2\!=\!CHSiCl_3$
Vinyltriethoxysilane, $CH_2\!=\!CHSi(OC_2H_5)_3$
Vinyltrimethoxysilane, $CH_2\!=\!CHSi(OCH_3)_3$
Vinyl-tris-(beta-methoxyethoxy)silane,
 $CH_2\!=\!CHSi(OC_2H_4OCH_3)_3$
Vinyltriacetoxysilane, $CH_2\!=\!CHSi(OCOCH_3)_3$
Allyltrichlorosilane, $CH_2\!=\!CHCH_2SiCl_3$

Aminoalkylsilanes gamma-Aminopropyltriethoxysilane,
 $H_2NCH_2CH_2CH_2Si(OC_2H_5)_3$
gamma-Aminopropyltrimethoxysilane,
 $H_2NCH_2CH_2CH_2Si(OCH_3)_3$
N-beta-(Aminoethyl)-gamma-aminopropyltrimethoxysilane, $H_2N(CH_2)_2NH(CH_2)_3Si(OCH_3)_3$ N'-(beta-aminoethyl)-N-(beta-aminoethyl)-gamma-aminopropyltrimethoxysilane, $H_2NCH_2CH_2NHCH_2CH_2NHCH_2CH_2CH_2Si(OCH_3)_3$

Ureidoalkylsilane esters gamma-Ureidoalkyltriethoxysilane,
 $H_2NCONHCH_2CH_2CH_2Si(OC_2H_5)_3$
gamma-Ureidoalkyltrimethoxysilane,
 $H_2NCONHCH_2CH_2CH_2Si(OCH_3)_3$

Epoxyalkylsilane esters beta-(3,4-Epoxycyclohexyl)ethyltrimethoxysilane,

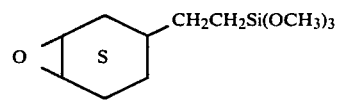

gamma-Glycidoxypropyltrimethoxysilane,

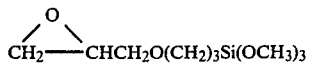

Methacryloxyalkylsilane esters gamma-Methacryloxypropyltrimethoxysilane,

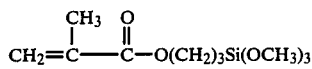

gamma-Methacryloxypropyl-tris-(beta-methoxyethoxy)silane,

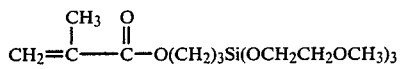

Mercaptoalkylsilane Esters gamma-Mercaptopropyltrimethoxysilane,
$HSCH_2CH_2CH_2Si(OCH_3)_3$
gamma-Mercaptopropyltriethoxysilane,
$HSCH_2CH_2CH_2Si(OC_2H_5)_3$ It will of course be self-evident that organofunctional silanes other than those specifically referred to above may be used in the practice of this invention. The organofunctional silane need only fit the description of the general formula or be generally equivalent to the functional monosilanes referred to above, and the suitability of any given organofunctional silane can readily be determined by performing a few tests utilizing the procedures described with reference to the Examples hereinafter.

Mixtures of two or more organofunctional silanes may of course be used.

A key advantage to the impact modifying organofunctional silanes of the present invention is that only a small amount of organofunctional silane is necessary to obtain the desired effect. Thus, the organofunctional silane is generally present in a range from about 0.05 to about 5 parts per hundred parts of PET. Preferably, the organofunctional silane is within the range of about 0.1 to about 1 part per hundred parts PET. Nevertheless it will be understood and appreciated that other proportions may be used if desired. All that is required is that the amount of organofunctional silane added to the PET composition be sufficient to impart increased impact strength to the composition.

It is not known whether impact strength may be improved by addition of organofunctional silane to suitably reinforced PET blends from which the epoxidized crystallization promoter and nucleating agent have been omitted. It is believed however that all of these components should be used in order to achieve the best balance of properties, including increased impact strength.

Other Ingredients

As mentioned previously, other additives may also be utilized in the compositions of this invention to achieve certain desirable characteristics in the final injection molded product. For example, flame retardents may be added if the end use of the product requires the product to be possibly subjected to ignition sources. Flame-retarding additives which can be used for this purpose comprise a large number of chemical compounds which are well known to those skilled in the art. In general, they contain chemical elements which are used because of their flame-retarding capacity, for example, bromine, chlorine, antimony, phosphorus and nitrogen. Preferably, the flame-retarding additives are bromine and/or chlorine containing organic compounds (optionally used together with auxiliary compounds, such as antimony trioxide, zinc borate, etc.) or elementary phosphorus or phosphorus compounds such as ammonium polyphosphate, various bromine and/or chlorine containing organic phosphate esters, hexaphenoxyphosphazene and the like. In general the flame retardent additive or system will be employed in amounts ranging from about 5 to about 30 parts per hundred parts of the PET present in the blend. But here again deviations from this range are permissible and within the ambit of this invention.

For protection against thermo-oxidative degradation, the customary amounts of stabilizers, preferably from about 0.001 to about 0.5 parts per hundred based upon the weight of the unstabilized composition, can be added to the compositions of this invention. Examples of suitable stabilizers are phenols and phenol derivatives, preferably sterically hindered phenols which contain alkyl substituents with 1–6 carbon atoms in both ortho positions to the phenolic hydroxyl groups; amines, preferably secondary arylamines and their derivatives; phosphates and phosphites, preferably the aryl derivatives thereof; and quinones. Non-limiting examples include:

4,4'-bis(2,6-di-tert-butylphenol),
1,3,5-trimethyl-2,4,6-tris(3,5-di-tert-butyl-4-hydroxybenzyl)benzene,
4,4'-methylenebis(2,6-di-tert-butylphenol),
4,4'-butylidenebis(6-tert-butyl-m-cresol)
3,5-di-tert-butyl-4-hydroxybenzylphosphonic acid diethyl ester,
N,N'-bis($\beta$-naphthyl)-p-phenylenediamine,
N,N'-bis(1-methylheptyl)-p-phenylenediamine, phenyl-$\beta$-naphthylamine,
4,4'-bis($\alpha,\alpha$-dimethylbenzyl)diphenylamine,
hydroquinone,
p-benzoquinione,
p-tert-butylpyrocatechol,
chloranil, and
naphthoquinone.

To the compositions of this invention there may be additionally added ultraviolet ray absorbents, lubricants, antistatic agents, colorizing agents (e.g., zinc sulfide), antifungal agents, foaming agents, etc. depending upon the ultimate use of the article injection molded.

Compounding and Molding

The compositions of this invention may be prepared by blending the components in a blender (e.g., a tumble blender or a mixer such as a Henschel mixer) and compounding the mixture in an extruder (e.g., a twin-screw compounding extruder such as a 28 mm Werner-Pfleiderer extruder or the like). Thereafter, the extrudate is chopped into pellets suitable for use in molding operations with injection molding machines or the like. The thermoplastic compositions of this invention used to produce the finished molded articles of this invention, can also be prepared by mixing the components to form a premix, compounding the premix and injection molding the compositions at mold temperatures from about 120° F. to about 200° F., preferably from about 120° F. to about 150° F. Those skilled in the art will recognize that the PET and the PET blends should be dried prior to melt processing.

When injection molded, the compositions of this invention yield articles having a good balance of physical properties.

Compounds that yield molded articles having a desirable balance of physical properties—e.g., enhanced Izod Impact—have been obtained using a vacuum-vented, 1¼" Killion Model KL-125 extruder with a barrel temperature of about 525° F.; it is anticipated that barrel temperatures within the range of about 480° F. to about 550° F. or higher are useful, depending upon the volatility of the silane impact improver. Those skilled in the art will appreciate that the compounding and molding conditions may vary depending on the equipment used (e.g., size of the extruder, the screw configuration, and other physical or mechanical considerations).

No special processing or order of mixing the ingredients is required. However, since very small quantities of organofunctional silane is used it may be difficult to achieve good dispersion of the silane in the PET composition. Thus, the silane is usually added to the epoxidized crystallization promoter. Then all the ingredients are blended by standard techniques before being fed into the compounding extruder.

The present invention is further illustrated in the following examples, which are not to be construed as limiting.

EXAMPLES

The PET compositions of the following examples were prepared by mixing the components to form a premix, compounding the premix on a vacuum-vented 1¼" Killion Model KL-125 extruder, and molding the compound pellets into test bars on a Cincinnati-Milacron Model No. 250-12 injection molding machine. The PET was dried approximately 16 hours at about 120° C. prior to forming the premix. Compounding of the premix was done with a barrel temperature of about 525°–550° F. Compound pellets were dried about 16 hours at about 120° C. prior to injection molding test bars. The injection molding of the test bars was performed with a barrel temperature of about 510°–520° F., a mold temperature of about 200° F., a total cycle time of approximately 50 seconds (cooling time: 30 seconds), and a hold pressure in the range of about 5,000–10,000 psi.

The designation "phr" in the tables stands for parts per hundred parts by weight of poly(ethylene terephthalate).

The particular materials used in these compositions were as follows:

Polyethylene Terephthalate (PET): VITUF 5901, from Goodyear Chemical Company, having an intrinsic viscosity of 0.59 as measured at 25° C. using a solvent consisting of 60 percent by weight of phenol and 40 percent by weight of tetrachloroethane.

Glass Fiber: PPG 3540 from PPG Industries, a chopped strand of ⅛ inch cut length and treated with a silane binder.

Processed Mineral Fiber: PMF-604 from Jim Walter Resources, Inc.

Epoxidized Crystallization Promoter: Epoxidized octyl oleate (octyl epoxy stearate), from Argus Chemical Corp. under the designation DRAPEX 3.2;

Nucleating Agent: sodium stearate, from WITCO Chemical Co., a heat-stable grade.

In the tables that follow, physical properties were determined by the following ASTM procedures: Flexural strength and Flexural Elastic Modulus—D 790-71 (1978); Izod Impact—D 256-78; Heat Deflection Temperature—D 648-72 (1978); Specific Gravity—D 792-66; Tensile Strength and Tensile Modulus—D 638-82.

EXAMPLES 1–4

Table I reports a variety of physical properties for the poly(ethylene terephthalate) (PET) compositions identified in Examples 1–4. The blends of Examples 2 and 4 contained gamma-aminopropyltriethoxysilane (A-1100 of Union Carbide Corporation). Examples 1 and 3 are controls presented for comparison. The data in Table I illustrate that improved impact strength (Izod Impact) is obtained by the use of A-1100. Other physical properties including heat deflection temperature were not adversely affected.

TABLE I

| Reinforced Polyethylene Terephthalate | | | | |
|---|---|---|---|---|
| Example | 1 | 2 | 3 | 4 |
| VITUF 5901 PET, parts | 100 | 100 | 100 | 100 |
| PPG 3540 (glass), phr | 43 | 43 | 31 | 31 |
| PMF-604, phr | — | — | 23 | 23 |
| DRAPEX 3.2, phr | 3.0–3.2 | 2.0–3.2 | 2.0–3.2 | 3.0–3.2 |
| Na stearate, phr | 0.5 | 0.5 | 0.5 | 0.5 |
| UNION CARBIDE A-1100, phr | — | 0.43 | — | 0.54 |
| ¼ in. Izod Impact, ft.-lb./in. | 1.40 | 1.90 | 1.30 | 1.50 |
| Heat Deflection Temperature @ 264 psi, °C. | 234 | 228 | 238 | 229 |
| Specific Gravity | 1.567 | 1.559 | 1.628 | 1.625 |
| Tensile Strength, psi | 17,100 | 15,200 | 13,700 | 14,700 |
| Tensile Modulus, $10^3$ psi | 1580 | 1620 | 1760 | 1740 |
| Flexural Strength, psi | 27,700 | 27,500 | 26,100 | 24,600 |
| Flexural Modulus, $10^3$ psi | 1410 | 1390 | 1430 | 1420 |
| Moldability, # sticks/# shots | 1/12 | 2/16 | 2/17 | 0/17 |

EXAMPLES 5–8

Examples 5–8 were conducted in essentially the same fashion as Examples 1–4. However, a different organofunctional silane was used as the impact modifier. In particular, the blends of Examples 6 and 8 contained gamma-glycidoxypropyltrimethoxysilane (Union Carbide A-187). Once again, a noticeable improvement was obtained for the Izod Impact test while the other physical properties tested were essentially unchanged.

TABLE II

| Reinforced Polyethylene Terephthalate | | | | |
|---|---|---|---|---|
| Example | 5 | 6 | 7 | 8 |
| PET, parts | 100 | 100 | 100 | 100 |
| PPG 3540 (glass), phr | 43 | 43 | 31 | 31 |
| PMF-604, phr | — | — | 23 | 23 |
| DRAPEX 3.2, phr | 3.0 | 3.0 | 3.0 | 3.0 |
| Na stearate, phr | 0.5 | 0.5 | 0.5 | 0.5 |
| UNION CARBIDE A-187, phr | — | 0.43 | — | 0.54 |
| ¼ in. Izod Impact, ft.-lb./in. | 1.50 | 1.90 | 1.20 | 1.60 |
| Heat Deflection Temperature @ 264 psi, °C. | 236 | 239 | 233 | 230 |
| Specific Gravity | 1.564 | 1.570 | 1.630 | 1.627 |
| Tensile Strength, psi | 19,100 | 18,200 | 16,400 | 15,400 |

TABLE II-continued

| Reinforced Polyethylene Terephthalate | | | | |
|---|---|---|---|---|
| Example | 5 | 6 | 7 | 8 |
| Tensile Modulus, 10³psi | 1540 | 1530 | 1670 | 1690 |
| Flexural Strength, psi | 30,000 | 27,500 | 26,400 | 25,600 |
| Flexural Modulus, 10³psi | 1420 | 1390 | 1450 | 1480 |
| Moldability, # sticks/ # shots | 0/11 | 0/11 | 0/12 | 0/12 |

EXAMPLES 9–11

Examples 9–11 were conducted in essentially the same fashion as Examples 1–4. gamma-Aminopropyltriethoxysilane (UNION CARBIDE A-1100) and gamma-glycidoxypropyltrimethoxysilane (UNION CARBIDE A-187) were tested as impact modifiers in Examples 10 and 11 respectively. As seen from the data in Table III, improved Izod Impact values were obtained from both. In these tests A-187 was the more effective impact modifier.

TABLE III

| Glass-Reinforced Polyethylene Terephthalate | | | |
|---|---|---|---|
| Example | 9 | 10 | 11 |
| PET, parts | 100 | 100 | 100 |
| PPG 3540 (glass), phr | 43 | 43 | 43 |
| DRAPEX 3.2, phr | 3.0 | 3.0 | 3.0 |
| Na stearate, phr | 0.5 | 0.5 | 0.5 |
| UNION CARBIDE A-1100, phr | — | 0.54 | — |
| UNION CARBIDE A-187, phr | — | — | 0.54 |
| ¼ in. Izod Impact, ft.-lb./in. | 1.50 | 2.00 | 2.30 |
| Heat Deflection Temperature @ 264 psi, °C. | 221 | 243 | 245 |
| Specific Gravity | 1.561 | 1.562 | 1.567 |
| Tensile Strength, psi | 17,800 | 19,400 | 18,200 |
| Tensile Modulus, 10³psi | 1530 | 1600 | 1340 |
| Flexural Strength, psi | 31,900 | 28,800 | 28,700 |
| Flexural Modulus, 10³psi | 1430 | 1390 | 1380 |
| Moldability, # sticks/ # shots | 0/13 | 0/13 | 0/10 |

EXAMPLES 12 and 13

Examples 12 and 13 were conducted to determine if the organofunctional silane operated as a crystallization promoter. Thus in Example 13, DRAPEX 3.2 was replaced with gamma-glycidoxypropyltrimethoxysilane (UNION CARBIDE A-187). The results of Table IV indicated that the organofunctional silane does not act as a crystallization promoter since the blend of Example 13 had very poor moldability (8 sticks/8 shots). It will be noted however that the organofunctional silane caused an increase in impact strength even though the epoxidized crystallization promoter had been omitted from the blend of Example 13.

TABLE IV

| Glass-Reinforced Polyethylene Terephthalate | | |
|---|---|---|
| Example | 12 | 13 |
| PET, parts | 100 | 100 |
| PPG 3540 (glass), phr | 43 | 43 |
| DRAPEX 3.2, phr | 3.0 | — |
| UNION CARBIDE A-187, phr | — | 3.0 |
| Na stearate, phr | 0.5 | 0.5 |
| ¼ in. Izod Impact, ft.-lb./in. | 1.80 | 2.20 |
| Heat Deflection Temperature @ 264 psi, °C. | 241 | 237 |
| Specific Gravity | 1.558 | 1.554 |
| Tensile Strength, psi | 21,700 | 10,100 |
| Tensile Modulus, 10³psi | 1480 | 1490 |
| Flexural Strength, psi | 33,200 | 16,600 |
| Flexural Modulus, 10³psi | 1430 | 1370 |
| Moldability, # sticks/ # shots | 0/16 | 8/8 |

EXAMPLES 14–16

Two more blends of this invention were prepared as in the above examples using in one case vinyl-tris-(beta-methoxyethoxy)silane (UNION CARBIDE A-172) and in the other gamma-methacryloxypropyltrimethoxysilane (UNION CARBIDE A-174) as the functional silane. Example 14 is the control. Table V shows the results.

TABLE V

| Glass-Reinforced Polyethylene Terephthalate | | | |
|---|---|---|---|
| Example | 14 | 15 | 16 |
| PET, parts | 100 | 100 | 100 |
| PPG 3540 (glass), phr | 43 | 43 | 43 |
| DRAPEX 3.2, phr | 3.0 | 3.0 | 3.0 |
| Na stearate, phr | 0.5 | 0.5 | 0.5 |
| UNION CARBIDE A-172, phr | — | 0.54 | — |
| UNION CARBIDE A-174, phr | — | — | 0.54 |
| ¼ in. Izod Impact, ft.-lb./in. | 1.90 | 2.50 | 2.60 |
| Heat Deflection Temperature @ 264 psi, °C. | 239 | 243 | 238 |
| Specific Gravity | 1.562 | 1.567 | 1.556 |
| Tensile Strength, psi | 20,900 | 17,800 | 16,100 |
| Tensile Modulus, 10³psi | 1710 | 1730 | 1820 |
| Flexural Strength, psi | 32,500 | 26,600 | 24,800 |
| Moldability, # sticks/ # shots | 0/11 | 0/14 | 1/8 |

EXAMPLES 17–19

A blend (Example 19) containing an organofunctional silane was prepared in which the reinforcing filler consisted of a processed mineral fiber (no glass fiber present) and its properties were compared to those of the compositions of Examples 17 and 18. Table VI shows the blends and results. In this instance the particular blend of Example 19 exhibited extremely poor properties, including low impact resistance, low heat deflection temperature and low tensile strength. Whether or not this result is an artifact is not known. If it is not an erroneous result, it would indicate that it is desirable to utilize formulations other than that of Example 19 when practicing the present invention.

TABLE VI

| Reinforced Polyethylene Terephthalate | | | |
|---|---|---|---|
| Example | 17 | 18 | 19 |
| PET, parts | 100 | 100 | 100 |
| PPG 3540 (glass), phr | 43 | 31 | — |
| PMF-604, phr | — | 23 | 43 |
| DRAPEX 3.2, phr | 3.0 | 3.0 | 3.0 |
| Na stearate, phr | 0.5 | 0.5 | 0.5 |
| UNION CARBIDE A-187, phr | — | — | 0.54 |
| ¼ in. Izod Impact, ft.-lb./in. | 1.60 | 1.20 | 0.40 |
| Heat Deflection Temperature @ 264 psi, °C. | 225 | 210 | 185 |
| Specific Gravity | 1.575 | 1.652 | 1.616 |
| Tensile Strength, psi | 22,400 | 16,800 | 8,830 |
| Tensile Modulus, 10³psi | 1460 | 1540 | 1160 |
| Flexural Strength, psi | 34,000 | 26,400 | 15,000 |
| Flexural Modulus, 10³psi | 1360 | 1440 | 1120 |
| Moldability, # sticks/ | 0/17 | 2/14 | 0/14 |

TABLE VI-continued

| Reinforced Polyethylene Terephthalate | | | |
|---|---|---|---|
| Example | 17 | 18 | 19 |
| # shots | | | |

EXAMPLES 20-21

The improvements achievable in low-warp blends of this invention are illustrated in these Examples. The warp-reducing filler used in this instance was a commercially-available finely-divided mica (Suzorite 60S, a product of Marietta Resources International Ltd.). The blends and test specimens were prepared and tested as in the preceding examples. Table VII sets forth the relevant information.

TABLE VII

| Glass-Reinforced Low-Warp Grade of Polyethylene Terephthalate | | |
|---|---|---|
| Example | 20 | 21 |
| PET, parts | 100 | 100 |
| PPG 3540 (glass), phr | 31 | 31 |
| Suzorite 60S (mica), phr | 23 | 23 |
| DRAPEX 3.2, phr | 3.0 | 3.0 |
| Na stearate, phr | 0.5 | 0.5 |
| UNION CARBIDE A-187, phr | — | 0.54 |
| ¼ in. Izod Impact, ft.-lb./in. | 1.00 | 1.30 |
| Heat Deflection Temperature @ 264 psi, °C. | 210 | 227 |
| Specific Gravity | 1.618 | 1.597 |
| Tensile Strength, psi | 14,900 | 14,400 |
| Tensile Modulus, $10^3$psi | 2070 | 1570 |
| Flexural Strength, psi | 24,200 | 23,900 |
| Flexural Modulus, $10^3$psi | 1710 | 1690 |
| Warp, Before/After Aging, mm (Aging: 24 hrs at 180° C.) | 1.3/1.0 | 0.9/1.1 |
| Moldability, # sticks/# shots | 0/15 | 0/13 |

EXAMPLES 22-24

Examples 23 and 24 show the average physical property values for two sets of samples in which a commercially-available titanate-type of coupling agent was used in lieu of an organofunctional silane. The data from these examples is shown in Table VIII. Example 22 is the control for comparison purposes. The titanates (KenReact KR-38-5 and KR-9-5 available from Kenrich Petrochemicals, Inc.) did not improve impact strength or other physical properties. Thus, the impact improvement obtained pursuant to this invention by use of organofunctional silanes is not simply the result of having additional amounts of traditional coupling agents present.

TABLE VIII

| Glass-Reinforced Polyethylene Terephthalate | | | |
|---|---|---|---|
| Example | 22 | 23 | 24 |
| PET, parts | 100 | 100 | 100 |
| PPG 3540 (glass), phr | 43 | 43 | 43 |
| DRAPEX 3.2, phr | 3.0 | 3.0 | 3.0 |
| Na stearate, phr | 0.5 | 0.5 | 0.5 |
| KR-38-5 (coupling agent), phr | — | 0.42 | — |
| KR-9-5 (coupling agent), phr | — | — | 0.42 |
| ¼ in. Izod Impact, ft.-lb./in. | 1.20 | 1.05 | 1.30 |
| Heat Deflection Temperature @ 264 psi, °C. | 226.5 | 227.5 | 214.5 |
| Specific Gravity | 1.578 | 1.566 | 1.572 |
| Tensile Strength, psi | 19,050 | 14,400 | 18,950 |
| Tensile Modulus, $10^3$psi | 1470 | 1520 | 1535 |
| Flexural Strength, psi | 28,600 | 21,000 | 27,400 |
| Flexural Modulus, $10^3$psi | 1335 | 1350 | 1360 |

TABLE VIII-continued

| Glass-Reinforced Polyethylene Terephthalate | | | |
|---|---|---|---|
| Example | 22 | 23 | 24 |
| Moldability, # sticks/# shots | 18/20 | 15/20 | 18/20 |

EXAMPLES 25-28

The purpose of these experiments was to determine whether the improvements in impact strength achieved by use of organofunctional silanes in PET could be achieved in glass reinforced polybutylene terephthalate (PBT) molding compositions. The compositions that were produced and tested, and the results obtained are given in Table IX, the organofunctional silane used being gamma-methacryloxypropyltrimethoxysilane (UNION CARBIDE A-174). It can be seen that in these tests neither impact strength nor any other property was materially improved by the use of this additive system in PBT.

TABLE IX

| Glass-Reinforced Polybutylene Terephthalate | | | | |
|---|---|---|---|---|
| Example | 25 | 26 | 27 | 28 |
| PBT, parts | 100 | 100 | 100 | 100 |
| PPG 3540 (glass), phr | 43 | 43 | 43 | 43 |
| UNION CARBIDE A-174, phr | — | 0.42 | 0.42 | 0.42 |
| DRAPEX 3.2, phr | — | — | 3.0 | — |
| Na stearate, phr | — | — | — | 0.5 |
| 174 in. Izod Impact, ft.-lb./in. | 2.00 | 2.10 | 2.10 | 1.90 |
| Heat Deflection Temperature @ 264 psi, °C. | 213 | 216 | 220 | 217 |
| Specific Gravity | 1.503 | 1.514 | 1.506 | 1.506 |
| Tensile Strength, psi | 18,200 | 16,000 | 16,900 | 16,900 |
| Tensile Modulus, $10^3$psi | 1390 | 1230 | 1040 | 12 1040 |
| Flexural Strength, psi | 28,600 | 31,600 | 27,700 | 27,700 |
| Flexural Strength, $10^3$psi | 1250 | 1220 | 1110 | 1330 |
| Moldability, # sticks/# shots | 0/14 | 0/16 | 0/22 | 0/12 |

The foregoing disclosure and description of the invention is illustrative and explanatory thereof and various changes in the illustrated compositions and methods may be made within the scope of the appended claims without departing from the spirit of the invention.

What is claimed is:

1. In a thermoplastic composition for injection and extrusion molding prepared by blending or compounding components comprising a poly(ethylene terephthalate) containing a reinforcing amount of a reinforcing filler, an epoxidized crystallization promoter, and a nucleating agent, the improvement pursuant to which the composition has included therein a small amount of organofunctional silane having a plurality of readily hydrolyzable substituents, said amount of said silane being sufficient to increase the impact strength of an article molded from the composition as compared to the impact strength of the same article molded in the same way from the same composition absent such inclusion.

2. A composition of claim 1 in which the reinforcing filler comprises glass fibers.

3. A composition of claim 1 in which the reinforcing filler comprises glass fibers pretreated with a coupling agent.

4. A composition of claim 1 in which the reinforcing filler consists essentially of glass fibers pretreated with a silane coupling or bonding agent.

5. A composition of claim 2 further including a finely-divided warp-reducing mineral filler.

6. A composition of claim 5 in which the mineral filler is mica.

7. A composition of claim 1 in which the organofunctional silane is an alkenylsilane.

8. A composition of claim 1 in which the organofunctional silane is an aminosilane.

9. A composition of claim 1 in which the organofunctional silane is an epoxyalkylsilane.

10. A composition of claim 1 in which the organofunctional silane is a methacryloxyalkylsilane.

11. A composition of claim 1 in which the epoxidized crystallization promoter is a hydrocarbyl ester of a mono epoxidized alkenoic acid, said ester being characterized by containing from about 12 to about 50 carbon atoms in the molecule.

12. A composition of claim 1 in which the epoxidized crystallization promoter is an epoxidized unsaturated triglyceride containing at least one epoxide group.

13. A composition of claim 1 in which the epoxidized crystallization promoter is an epoxy ester mixture comprising at least one monoepoxy aliphatic monocarboxylic acid ester and at least one diepoxy aliphatic monocarboxylic acid in which each of the epoxy esters contains from about 7 to about 50 carbon atoms in the molecule. compounding into the composition a small amount of an organofunctional silane having a plurality of readily hydrolyzable substituents, the amount of said silane being sufficient to increase the impact strength of an article molded from the composition as compared to the impact strength of the same article molded in the same way from the same composition not subjected to the compounding with such silane.

14. A composition of claim 1 in which the epoxidized crystallization promoter is an epoxidized vegetable oil and the nucleating agent is a sodium salt of a monocarboxylic acid.

15. A composition of claim 1 in which the epoxidized crystallization promoter is epoxidized octyl oleate and the nucleating agent is sodium stearate.

16. A composition of claim 1 in which the nucleating agent is an alkali metal salt of a carboxylic acid.

17. A composition of claim 1 in which the nucleating agent is a sodium salt of a carboxylic acid.

18. A method of increasing the impact strength of a thermoplastic poly(ethylene terephthalate) composition adapted for injection and extrusion molding containing a reinforcing amount of a reinforcing filler, an epoxidized crystallization promoter, and a nucleating agent, which method comprises compounding into the composition a small amount of an organofunctional silane having a plurality of readily hydrolyzable substituents, the amount of said silane being sufficient to increase the impact strength of an article molded from the composition as compared to the impact strength of the same article moded in the same way from the same composition not subjected to the compounding with such silane.

19. The method of claim 18 in which the amount of the organofunctional silane compounded into the composition is in the range of from amount 0.05 to about 5 parts per hundred parts of the poly(ethylene terephthalate).

* * * * *

UNITED STATES PATENT AND TRADEMARK OFFICE
CERTIFICATE OF CORRECTION

PATENT NO. : 4,551,485

DATED : November 5, 1985

INVENTOR(S) : Gary S. Ragan and Jesse D. Jones

It is certified that error appears in the above-identified patent and that said Letters Patent is hereby corrected as shown below:

Column 6, line 44, reads "proportions made be made" and should read -- proportions may be made --.

Column 7, line 22, reads "desirable to to employ" and should read -- desirable to employ --.

Column 16, line 32, reads "174 in. Izod Impact," and should read -- 1/4 in. Izod Impact, --.

Column 16, line 38, reads "1390 1230 1040 12 1040" and should read -- 1390 1230 1040 1040 --.

Column 17, line 27-32, reads "cule.compounding into the composition a small amount of an organofunctional silane having a plurality of readily hydrolyzable substituents, the amount of said silane being sufficient to increase the impact strength of an article molded from the composition as compared to the impact strength of the same article molded in the" and should read -- cule. --.

Column 18, line 1-2 reads "same way from the same composition not subjected to the compounding with such silane." and should be deleted .

UNITED STATES PATENT AND TRADEMARK OFFICE
CERTIFICATE OF CORRECTION

PATENT NO. : 4,551,485

DATED : November 5, 1985

INVENTOR(S) : Gary S. Ragan and Jesse D. Jones

It is certified that error appears in the above-identified patent and that said Letters Patent is hereby corrected as shown below:

Column 18, line 29 reads "amount" and should read -- about --.

*Signed and Sealed this*

*Eleventh* Day of *March 1986*

[SEAL]

*Attest:*

DONALD J. QUIGG

*Attesting Officer*        *Commissioner of Patents and Trademarks*